US008848295B2

(12) United States Patent
Smith et al.

(10) Patent No.: US 8,848,295 B2
(45) Date of Patent: Sep. 30, 2014

(54) GRADIENT INDEX LENSES AND METHODS WITH ZERO SPHERICAL ABERRATION

(75) Inventors: David R. Smith, Durham, NC (US); Nathan B. Kundtz, Kirkland, WA (US)

(73) Assignee: Duke University, Durham, NC (US)

(*) Notice: Subject to any disclaimer, the term of this patent is extended or adjusted under 35 U.S.C. 154(b) by 546 days.

(21) Appl. No.: 12/924,823

(22) Filed: Oct. 6, 2010

(65) Prior Publication Data

US 2011/0116170 A1     May 19, 2011

Related U.S. Application Data

(60) Provisional application No. 61/249,111, filed on Oct. 6, 2009.

(51) Int. Cl.
*G02B 3/00*     (2006.01)
*G02B 9/00*     (2006.01)

(52) U.S. Cl.
USPC ........... 359/652; 359/653; 359/654; 359/655; 359/664; 359/724; 359/737; 359/741; 359/742; 359/743

(58) Field of Classification Search
USPC .......... 359/652–655, 664, 724, 737, 741–743
See application file for complete search history.

(56) References Cited

U.S. PATENT DOCUMENTS

| | | | |
|---|---|---|---|
| 4,848,882 A | 7/1989 | Suzuki et al. | |
| 4,900,138 A | 2/1990 | Atkinson, III et al. | |
| 5,047,776 A | 9/1991 | Baller | |
| 5,900,847 A | 5/1999 | Ishikawa et al. | |
| 5,986,818 A | 11/1999 | Hashimura | |
| 5,995,295 A | 11/1999 | Nagaoka | |
| 6,020,850 A | 2/2000 | Ji et al. | |
| 6,550,983 B1 | 4/2003 | Gilliland et al. | |
| 6,788,472 B1 | 9/2004 | Iwasaki | |
| 7,538,946 B2 | 5/2009 | Smith et al. | |
| 7,570,432 B1 | 8/2009 | Yonak | |
| 8,563,913 B2 | 10/2013 | Dowski, Jr. et al. | |
| 8,599,301 B2 | 12/2013 | Dowski, Jr. et al. | |

(Continued)

FOREIGN PATENT DOCUMENTS

| | | |
|---|---|---|
| EP | 2486432 | 8/2012 |
| JP | S 62285805 | 11/1987 |

(Continued)

OTHER PUBLICATIONS

EP Search Report for Application No. PCT/US 2010/051637 dated Aug. 20, 2012.

(Continued)

*Primary Examiner* — Evelyn A. Lester
(74) *Attorney, Agent, or Firm* — Jenkins, Wilson, Taylor & Hunt, P.A.

(57) ABSTRACT

Gradient index lenses with no aberrations and related methods for making such lenses are described. In one aspect, a gradient index lens can be a substantially spherically-shaped lens that has at least one side that is flattened such that a locus of focal points resides on a plane. A method for making a gradient index lens can include forming material layers, each of the material layers defining an effective refractive index, and laminating the material layers together to form a substantially spherically-shaped lens having at least one side that is flattened to a substantially planar surface. The material layers can have a gradient refractive index distribution such that a locus of focal points resides on the substantially planar surface.

17 Claims, 5 Drawing Sheets

(56) References Cited

U.S. PATENT DOCUMENTS

| | | |
|---|---|---|
| 2004/0028339 A1 | 2/2004 | Murphy et al. |
| 2005/0007675 A1 | 1/2005 | Matsumoto et al. |
| 2008/0049291 A1 | 2/2008 | Baek et al. |
| 2008/0165079 A1 | 7/2008 | Smith et al. |
| 2008/0221388 A1 | 9/2008 | Siebel et al. |
| 2011/0116170 A1 | 5/2011 | Smith et al. |

FOREIGN PATENT DOCUMENTS

| | | |
|---|---|---|
| JP | S 63123590 | 5/1988 |
| JP | S 63172026 (U) | 11/1988 |
| JP | H 01116587 (U) | 8/1989 |
| JP | H 04232486 | 8/1992 |
| JP | 05288943 | 11/1993 |
| JP | H 07109125 | 4/1995 |
| JP | H 07325263 | 12/1995 |
| JP | H 09199936 | 7/1997 |
| JP | H 11190819 | 7/1999 |
| JP | 2006/506684 | 2/2006 |
| JP | WO 2006/506684 | 5/2006 |
| JP | 2008/507733 | 3/2008 |
| JP | 2008/519289 | 6/2008 |
| JP | 2009/020395 | 1/2009 |
| JP | 2009/533885 | 9/2009 |
| JP | 2011/055084 | 3/2011 |
| WO | WO 2004/046779 | 6/2004 |
| WO | WO 2008/055094 | 11/2008 |
| WO | WO 2008/144361 | 11/2008 |
| WO | WO 2011/044239 | 4/2011 |

OTHER PUBLICATIONS

International Search Report for PCT/US2010/051637 dated Nov. 26, 2010.

European Office Action for Application No. 10 822 605.1 dated Apr. 15, 2013.

European Office Action for Application No. 10 822 605.1 dated Sep. 6, 2013.

Japanese Office Action for Application No. 2012-533279 dated Jun. 12, 2014.

GRADIENT INDEX LENSES AND METHODS WITH ZERO SPHERICAL ABERRATION

RELATED APPLICATIONS

The presently disclosed subject matter claims the benefit of U.S. Patent Application Ser. No. 61/249,111, filed Oct. 6, 2009, the disclosure of which is incorporated by reference herein in its entirety.

TECHNICAL FIELD

The subject matter disclosed herein relates generally to gradient index optics, imaging and methods. More particularly, the subject matter disclosed herein relates to gradient index lenses and methods for creating gradient index lenses with no geometrical aberrations.

BACKGROUND

Because the trajectory of light is only altered at the input and the output surfaces of a conventional lens, and left to travel in a straight line within the volume of the lens, it is difficult to create as ideal an optical device as one would desire. Monochromatic aberrations, such as spherical or coma, are generally unavoidable with refractive optics and can at best be minimized through the use of systems of many lenses. The aberration profiles of lenses place an ultimate limit on certain high-performance imaging applications. Wide-angle imaging systems, for example, make use of stacks of lenses, yet often exhibit significant distortion even after optimization.

Gradient index lenses represent an alternative approach to lens design. Rather than relying on the interfaces of a uniform material to manipulate light, the index of refraction is varied throughout the body of the lens. Rays are no longer abandoned once entering the medium, but instead can be guided with far greater control to their ultimate destination. For instance, it has long been known that it is possible to create a gradient index lens with no geometrical aberrations, which focuses rays incident from infinity to the surface of a sphere. Such a lens is called a Luneburg lens, after the inventor.

Gradient index lenses are typically composed of inhomogeneous materials in which the index-of-refraction varies spatially throughout the volume of the medium. The Maxwell "fish eye" lens is a second example of this class of lenses, which achieve their function via a complicated, inhomogeneous medium as opposed to refractive lenses, which rely on engineering the interfaces between two mediums whose refractive indices differ. Though the Luneburg and the Maxwell "fish eye" and similar gradient index lenses have considerable advantages, such as wide field-of-view or significantly reduced geometrical aberration profiles, the particular well known examples typically have focal regions that lie on curved surfaces rather than planes, which is generally incompatible with the planar geometry of virtually all charge coupled device (CCD) arrays used to acquire images. In addition, the process of achieving large index gradients in a controlled manner poses a difficult fabrication challenge. For these reasons, these lenses have found only limited commercial success.

Because lenses such as the Luneburg or the Maxwell fish eye have such favorable imaging characteristics, however, it is of interest to develop a design that can render these gradient index devices more feasible for applications.

SUMMARY

In accordance with this disclosure, a class of gradient index lenses with no geometrical aberrations and methods for making such lenses are provided. In one aspect, a gradient index lens is provided. The lens can be a substantially spherically-shaped lens with the lens comprising at least one side that is flattened to a substantially planar surface and with the lens having or defining a gradient refractive index distribution such that a locus of focal points resides or is disposed on the substantially planar surface.

In another aspect, a gradient index lens can comprise a plurality of material layers laminated together to form a substantially spherically-shaped lens having at least one side that is flattened to a substantially planar surface. Each of the material layers can define an effective refractive index, and the plurality of material layers can together define a gradient refractive index distribution such that a locus of focal points resides or is disposed on the substantially planar surface.

In yet another aspect, a method for making a gradient index lens is provided. The method can include forming a plurality of material layers, each of the material layers defining an effective refractive index, and laminating the plurality of material layers together to form a substantially spherically-shaped lens having at least one side that is flattened to a substantially planar surface. In this way, the plurality of material layers can define a gradient refractive index distribution such that a locus of focal points resides or is disposed on the substantially planar surface.

Although some of the aspects of the subject matter disclosed herein have been stated hereinabove and are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 2a is a quasi-conformal map for a flattened Luneburg lens according to an aspect of the subject matter disclosed herein;

FIG. 2b is an inverse of the quasi-conformal map shown in FIG. 2a;

DETAILED DESCRIPTION

The present subject matter discloses a new class of gradient index lenses with no geometrical aberrations (e.g., no spherical aberration) and methods for making such lenses. A lens in accordance with this disclosure can be provided that is based on the Luneburg lens, but which has been warped so that one side is planar. The process or method used for the design of such a lens is, however, fundamentally different than typical lens designs. Rather than using the approximations of ray optics and repeated ray tracing to optimize the performance, a method according to the subject matter disclosed herein can begin with a "perfect" lens design, and then use techniques from the field of transformation optics to change the lens to meet other design criteria, such as a locus of focal points residing or disposed on a plane. Transformation optics is a methodology that provides a path for the design of advanced electromagnetic devices. Like gradient index devices, transformation optical materials are characterized by complex material properties, generally with independent spatial gradients in the elements of the constitutive tensors (e.g., electric permittivity and magnetic permeability). This approach provides an important distinction because transformation optics implicitly carry full wave information in the lens design.

To apply transformation optics in the context of lens design, a transformation can by applied to a particular optical element to improve the form factor and overall utility of the optic. Transformation optics follows from the observation that Maxwell's equations are "form invariant" with respect to coordinate transformations. Stated otherwise, Maxwell's equations can be written in an identical manner even when a coordinate transformation has been performed. Under such coordinate transformations, the material parameters transform as 2nd rank tensors of weight +1:

$$\varepsilon_r^{i'j'} = \frac{1}{|A|} A_i^{i'} A_j^{j'} \varepsilon_r^{ij} \quad (1)$$

$$\mu_r^{i'j'} = \frac{1}{|A|} A_i^{i'} A_j^{j'} \mu_r^{ij}$$

where $$A_i^{i'} = \frac{\partial x^{i'}}{\partial x^i} \quad (2)$$

Figure 1:
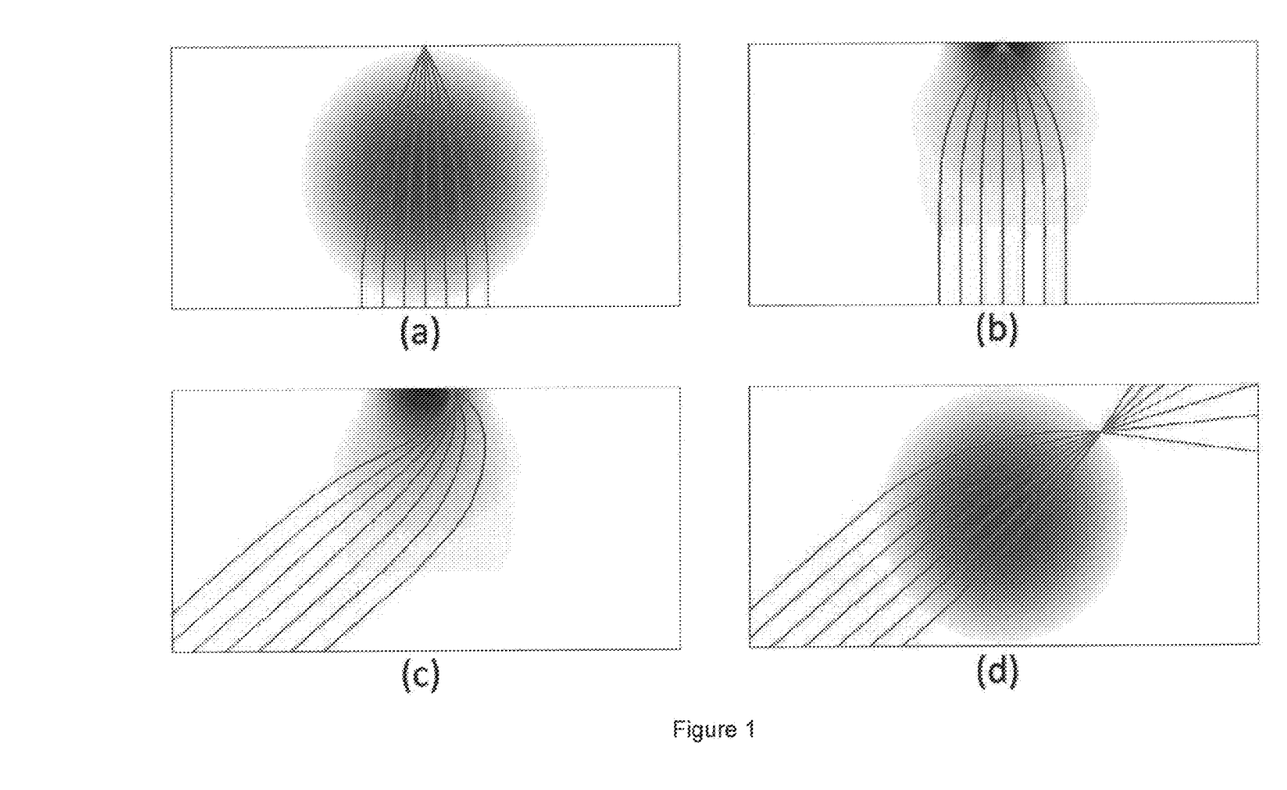
FIG. 1a illustrates ray tracing results for rays that are normally incident on a Luneburg lens.
FIG. 1b illustrates ray tracing results for rays that are normally incident on a flattened Luneburg lens according to an aspect of the subject matter disclosed herein.
FIG. 1c illustrates ray tracing results for rays at oblique incidence on a Luneburg lens.
FIG. 1d illustrates ray tracing results for rays at oblique incidence on a flattened Luneburg lens according to an aspect of the subject matter disclosed herein.

This invariance suggests that it is possible to perform a coordinate transformation that changes the trajectories that electromagnetic waves will follow, and applying that transformation to the constitutive tensors to arrive at a material that will achieve the anticipated function. For instance, the transformation optics approach can be applied to flatten one side of a Luneburg lens. Specifically, a transformation optics approach to warping of a Luneburg lens can involve flattening a region of the lens with a spherical protrusion. In this way, the line Y'=0 is normally curved in X-Y space, but after the transformation the line is flat. For instance, whereas FIGS. 1a and 1d provide ray tracing diagrams of rays incident on a typical spherical Luneburg lens, FIGS. 1b and 1c show ray tracing of modified Luneburg lens designs that focus rays to an image plane. The transformation does not change the nature of the original lens as a perfect imaging system. Rather, only the shape of the focal plane is changed.

The resulting medium that enables such a transformation, however, can require a strongly anisotropic material having spatial gradients in both the electric and magnetic properties. Such a material can be difficult to implement using conventional materials and can also be subject to limited bandwidth and non-negligible absorption due to the need for the magnetic response. A physical realization of this initial design can thus be challenging to realize at any wavelength and particularly unrealistic for shorter wavelengths approaching the visible spectrum of light.

To overcome the obstacles of previous gradient index lenses, metamaterials coupled with nanoscale lithographic techniques can be used to produce the optical elements. Moreover, since metamaterials offer a significantly broader range of material properties, including both electric and magnetic response and anisotropy, a correspondingly broader range of potential lens designs can be possible. For instance, a lens can be constructed from a plurality of material layers containing patterned metallic or metallodielectric inclusions whose effect on the index of a medium can be understood using metamaterial homogenization techniques. Such devices can be realized with tools as simple as patterned metal squares and have been studied and well understood for many years. Such materials exhibit very low loss when compared to their resonant counterparts. In addition, it is also feasible that such a material could be realized at wavelengths extending to the optical regime.

Figure 2:
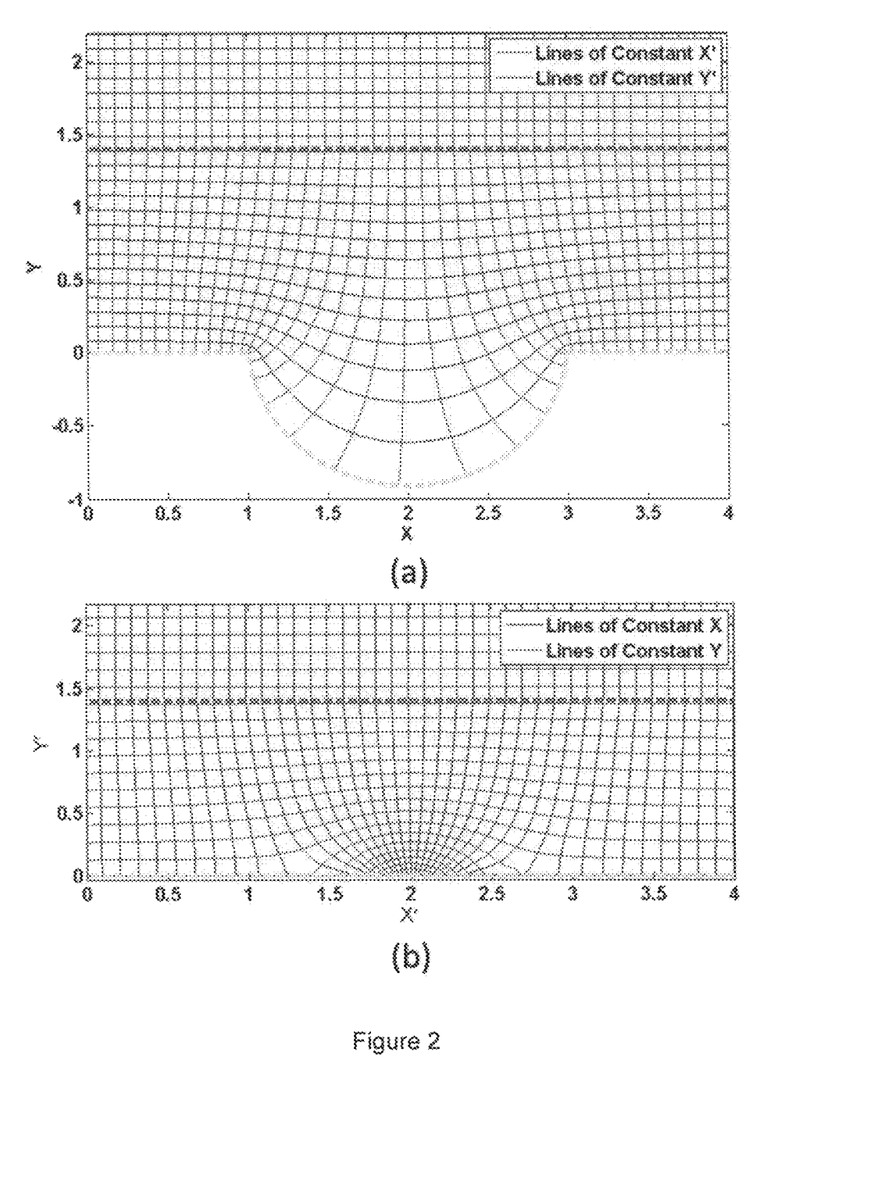

In addition, a technique of quasi-conformal transformation optics can be used, which for some transformations can result in a device with identical functionality to a standard transformation but can be implemented using isotropic materials relying only on gradients in the refractive index of the medium. Examples of a quasi-conformal map for the flattening of a portion of a spherical lens and its inverse are shown in FIGS. 2a and 2b, respectively. As shown in FIGS. 2a and 2b, the circular protrusion is mapped to a straight line that can make up the focal plane of the lens.

The quasi-conformal transformation optics design method can make use of a set of boundary conditions that define the effect of the device while restricting the transform inside of the material. In particular, angles between the coordinate lines can be preserved and there is limited anisotropy of the coordinate 'squares' (i.e. they are still approximately square, rather than rectangular). In contrast with a true conformal transformation, the quasi-conformal transformation optics technique can allow the module of the two domains to differ somewhat. For a two dimensional transform, this can lead to the prescription of a material with a dielectric-only response. Standard conformal grid generation methods can be used to realize such a transformation.

Figure 3:
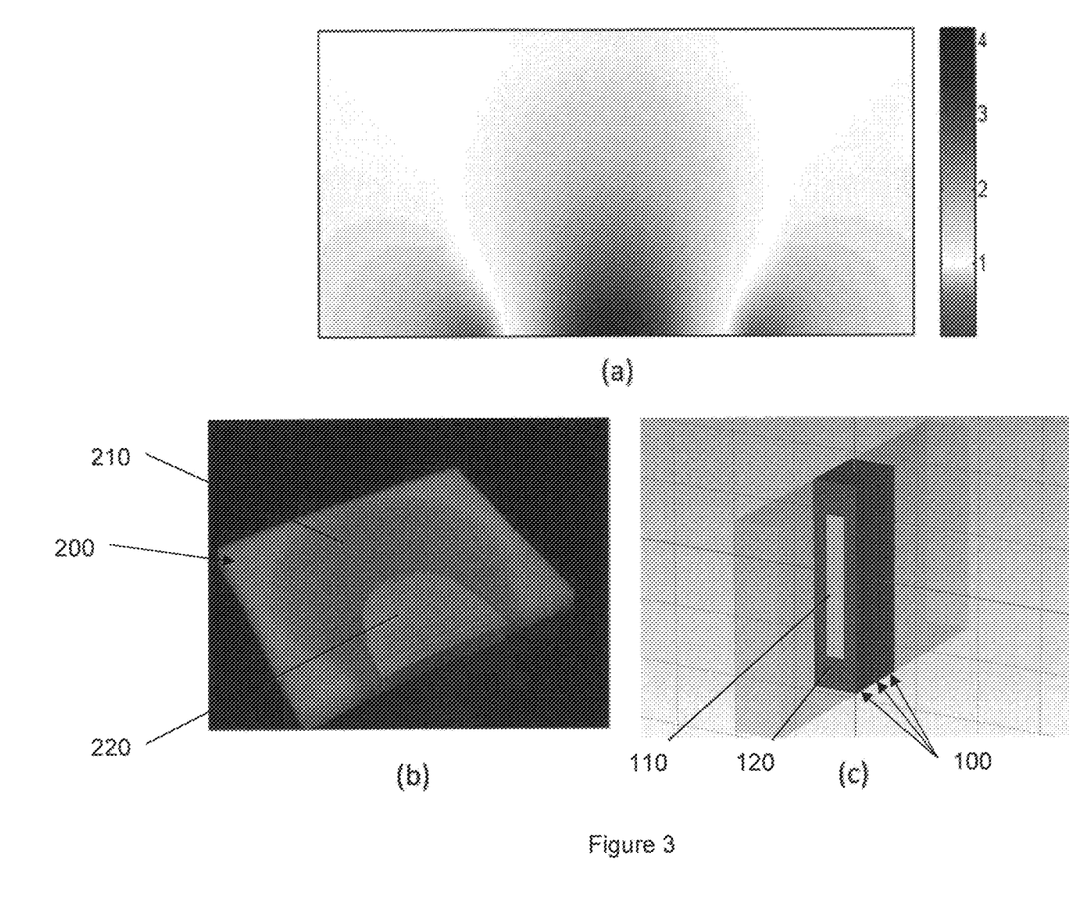
FIG. 3a is an index profile of a flattened Luneburg lens according to an aspect of the subject matter disclosed herein.
FIG. 3b is a sectional perspective view of a lens according to an aspect of the subject matter disclosed herein.
FIG. 3c is a perspective view of a plurality of laminated material layers used to form a lens according to an aspect of the subject matter disclosed herein.
Figure 4:
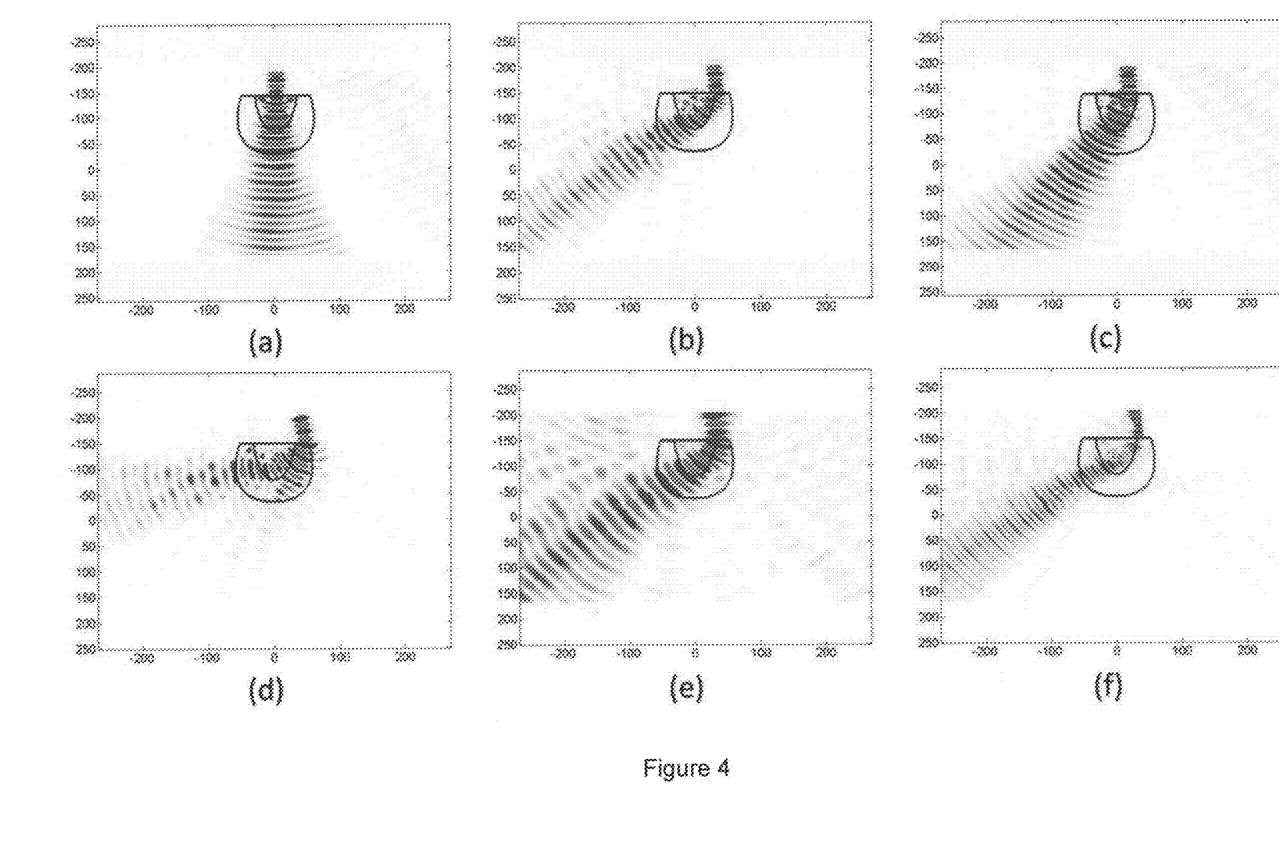
FIGS. 4a through 4f are experimental field maps of a lens according to aspects of the subject matter disclosed herein.

In one particular configuration, the lens fabricated to demonstrate the flattened Luneburg design can be built to work in a parallel plate waveguide that restricts the electromagnetic fields to two-dimensional TE-polarized waves. Two dimensional systems can allow for the experimental mapping of the fields within the lenses using sensitive near-field probes and a phase-sensitive network analyzer. It is important to note, however, that this design is not limited to a two-dimensional structure, although it is easiest to demonstrate the lack of spherical aberrations in 2D. An example of a measurement apparatus is described by Schurig et al., *Science* 314, 997 (2006), the disclosure of which is incorporated herein in its entirety. An index profile that can be used to produce this lens is shown, for example, in FIG. 3a. As shown in FIG. 3a, the index can be highest at the center of the profile, with a value of about 4 or higher, and the index away from the center of the profile can have a value of 1 or below.

It is noted, however, that some approximations can be used in the design of the lens. In particular, for instance, the index profile can be adjusted to remove regions of n<1. While an index less than 1 is achievable using metamaterials, for example, such a device can be inherently dispersive, which can in turn limit the bandwidth. To side-step this limitation, the index can be set to have a value of 1 in any region where it had previously been less than 1. It is believed that such approximations do not have a significant effect on the functionality of the resulting lens. For example, full wave simulations and ray tracing results of devices containing the n<1 regions showed similar results to those which did not. This result is qualitatively attributed to the fact that the light is strongly focused to the high index regions of the lens, largely avoiding the low index regions for all but the highest incidence angles.

In some particular arrangements, an index range of between about 1.08 to 4.1 can be used in the implementation of the present design. The index profile can be achieved by layering a plurality of material layers laid directly on top of one another. For instance, referring to FIG. 3c, a plurality of material layers 100 can each be formed by patterning metallic or metallodielectric material 110 on a fiber-reinforced plastic substrate 120. For instance, as is shown in FIG. 3c, the structure can include copper strips patterned onto FR-4 substrates (e.g., about 220 μm thick). The metallic or metallodielectric materials 110 can act as polarizable inclusions in the medium, increasing the overall polarizability of the material. The compact design of the laminated structure allows the index to be brought to a value of over 4 without using resonant particles or introducing excessive spatial dispersion, both of which can impose bandwidth limitations.

In particular, the dimensions of the individual layers can be specifically chosen to establish an effective index. Specifically, an interpolation scheme can be used to identify the appropriate layer dimensions for the desired index at each point in the respective region. In this way, a laminated structure formed from the plurality of layers 100 can define a desired index distribution based on a numerically-generated, quasi-conformal spatial transformation as described above. Specifically, for example, the laminated structure can be a lens having a substantially spherical shape with at least one side that is flattened to a substantially planar surface, the lens having or defining a gradient refractive index distribution such that a locus of focal points resides on or is disposed along the substantially planar surface.

Although the term "spherical" is used herein, the term is not used only to describe the volumetric shape of a lens. Though a sphere can be fit around the index profile, the profile itself does not have to be a sphere. It is a spherically symmetric distribution of index values, but there is not necessarily a physical sphere or a well-defined interface that has to be spherical. In effect, the Luneburg and Maxwell lenses are examples of lenses that have spherically symmetric gradient index distributions, and this disclosure relates to using transformation optics to change that distribution in such a manner so as to achieve focusing to a plane rather than a curved surface. However, in general the starting distribution may not have to be spherically symmetric.

To achieve the desired index range within a single lens, the lens can be divided into multiple regions (e.g., two regions). An example of a multi-region lens, generally designated 200, is shown in FIG. 3b. A first region 210 (e.g., the outer portion shown in FIG. 3b) can contain materials having a first refractive index distribution (e.g., a distribution between about 1 and 2). First region 210 can be fabricated in a similar manner to previous metamaterial gradient index devices. A second region 220 (e.g., the inner portion shown in FIG. 3b) can contain materials having a second refractive index distribution that is different than the first refractive index distribution (e.g., between about 2 to 4.1). Either or both of first region 210 or second region 220 can be constructed using a structure of laminated material layers 100, such as those shown in FIG. 3c.

Referring to FIGS. 4a through 4f, experimental field maps of a lens according to an aspect of the subject matter disclosed herein are presented. The field profiles show the results of testing of the exemplary lens using a dielectric waveguide to apply a source to different positions along the back surface of the lens. This setup allowed the effects of the impedance mismatch on the back of the lens to be minimized. As can be seen in the figures, the lens can produce approximate plane waves propagating in different directions as the position of the source is varied, extending to extreme angles approaching the horizon. It is noted that the material response is broadband. The effect of the lens does not qualitatively change between 7 GHz (See, e.g., FIG. 4e) and 15 GHz (See, e.g., FIG. 4f), for example.

Figure 5A:
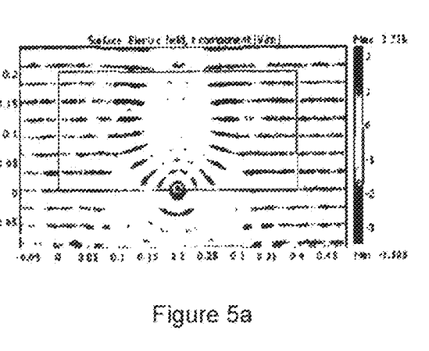
FIGS. 5a through 5c are graphs illustrating results of full wave simulations for a lens according to an aspect of the subject matter disclosed herein.
Figure 5B:
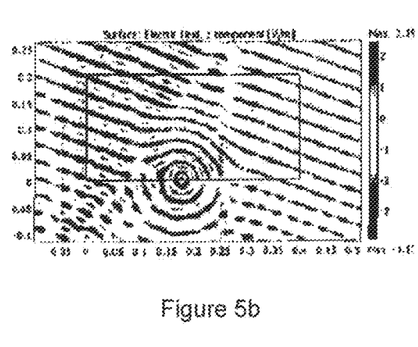
Figure 5C:
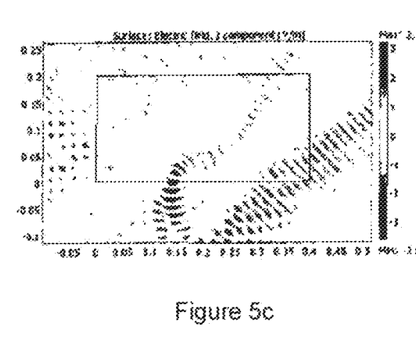

Similarly, FIGS. 5a through 5c provide results of full wave simulations for a lens according to an aspect of the subject matter disclosed herein. Specifically, FIGS. 5a, 5b, and 5c are the z-component of electrical field shown at 0, 20, and 45 degrees. It is noted that even at an incident angle of 45 degrees, there can be a tight focus on the rear plane of the lens.

In addition to the other advantages discussed above, it is further noted that index-only devices can be implemented without the need for resonant inclusions. This lack of resonant particles can enable such lenses to be scaled to infrared or even optical frequencies. Further, although orthogonal mappings are generally restricted to two dimensions, the principles disclosed herein can be applied to the development of a three dimensional lens.

One example of a specific potential application for such a lens would be automotive radar. Lenses that are in industrial use today in automobile radar are limited by spherical aberrations. As a result, they have an extremely limited field of view, often only 4-5 degrees before the focus is significantly off of the detection plane or the lens does not focus at all. By comparison, a lens designed as discussed herein requires no further advancement in materials technology for many implementations, but can easily have a field of view of 100 degrees or larger. This feature can dramatically improve existing devices. Such a lens is not limited to automobile radar, however. It may find use in communication satellites, large field of view cameras, and other applications where a wide field of view and high gain are valuable. The broadband nature of this design removes much of the restrictions usually associated with bringing metamaterials to commercial applications.

Specifically, at short wavelengths, a lens according to the subject matter disclosed herein can be used to design replacement optical devices that have previously required the use of complex systems of many lenses. At longer wavelengths, such systems that had previously been impractical because of size and weight limitations can be implemented using the disclosed designs. At microwave frequencies, for example, the disclosed lenses can effectively replace prior systems that relied on moving parts or complex systems such as phased-array antennas or a-planar antenna arrays-devices with significant bandwidth limitations.

The subject matter disclosed herein can be embodied in other forms without departure from the spirit and essential characteristics thereof. The aspects and embodiments described therefore are to be considered in all respects as illustrative and not restrictive. Although the subject matter disclosed herein has been described in terms of certain preferred aspects, other embodiments that are apparent to those of ordinary skill in the art are also within the scope of the present subject matter.

What is claimed is:

1. A gradient index lens comprising a substantially spherically-shaped lens with substantially zero geometrical aberrations, the lens comprising at least one side that is flattened to a substantially planar surface, the lens having a gradient refractive index distribution such that the substantially planar surface has a locus of focal points, wherein the lens comprises:
   a first region defining a first gradient refractive index distribution, wherein the first gradient refractive index distribution comprises refractive indices between about 1 and 2; and
   a second region defining a second gradient refractive index distribution that is different from the first gradient refractive index distribution, wherein the second gradient refractive index distribution comprises refractive indices between about 2 and 4.1.

2. The lens of claim 1, wherein the lens comprises a plurality of laminated material layers.

3. The lens of claim 2, wherein the plurality of laminated material layers comprises a metamaterial structure.

4. The lens of claim 2, wherein each of the plurality of laminated material layers comprises metallic or metallodielectric material patterned onto a fiber-reinforced plastic substrate.

5. The lens of claim 4, wherein each of the plurality of laminated material layers comprises copper strips patterned onto FR-4 substrates.

6. The lens of claim 1, wherein the lens has a field of view of about 100 degrees or greater.

7. The lens of claim 1, further comprising an imaging or antenna array positioned at the substantially planar surface.

8. A gradient index lens comprising a substantially spherically-shaped lens, the lens comprising at least one side that is flattened to a substantially planar surface, the lens having a gradient refractive index distribution such that the substantially planar surface has a locus of focal points, wherein the gradient refractive index distribution is based on a numerically-generated, quasi-conformal spatial transformation.

9. The lens of claim 8, wherein the numerically-generated, quasi-conformal spatial transformation is a numerically-generated, quasi-conformal spatial transformation of a Luneberg lens.

10. The lens of claim 8, wherein the numerically-generated, quasi-conformal spatial transformation corresponds to a mapping of a substantially curved surface to the substantially planar surface.

11. The lens of claim 10, wherein the substantially curved surface corresponds to an unflattened profile of the substantially spherically-shaped lens.

12. A gradient index lens comprising:
   a plurality of material layers, each of the material layers defining an effective refractive index, the plurality of material layers being laminated together to form a substantially spherically-shaped lens having at least one side that is flattened to a substantially planar surface;
   wherein the plurality of material layers define a gradient refractive index distribution such that a locus of focal points resides on the substantially planar surface; and
   wherein the gradient refractive index distribution is based on a numerically-generated, quasi-conformal spatial transformation of a Luneburg lens.

13. The lens of claim 12, wherein each of the plurality of material layers has predetermined dimensions selected to define a predetermined refractive index.

14. The lens of claim 12, wherein the plurality of material layers comprises:
   a first plurality of material layers laminated together to form a first region defining a first gradient refractive index distribution; and
   a second plurality of material layers laminated together to form a second region defining a second gradient refractive index distribution that is different from the first gradient refractive index distribution.

15. The lens of claim 14, wherein the first gradient refractive index distribution comprises refractive indices between about 1 and 2; and
   wherein the second gradient refractive index distribution comprises refractive indices between about 2 and 4.1.

16. The lens of claim 12, wherein each of the plurality of material layers comprises a metallic or metallodielectric material patterned onto a fiber-reinforced plastic substrate.

17. The lens of claim 16, wherein each of the plurality of material layers comprises copper strips patterned onto FR-4 substrates.

* * * * *